United States Patent [19]

Hirsch

[11] Patent Number: 6,033,701
[45] Date of Patent: *Mar. 7, 2000

[54] HYDRAULIC PRESSURE STERILIZATION AND PRESERVATION OF FOODSTUFF AND FEEDSTUFF

[76] Inventor: Gerald Phillip Hirsch, 3136 Brook Dr., Decatur, Ga. 30033-3912

[*] Notice: This patent is subject to a terminal disclaimer.

[21] Appl. No.: 08/756,123

[22] Filed: Nov. 25, 1996

Related U.S. Application Data

[63] Continuation-in-part of application No. 08/349,937, Dec. 6, 1994, Pat. No. 5,593,714.

[51] Int. Cl.⁷ ................................................ A23L 3/015
[52] U.S. Cl. .................. 426/268; 426/262; 426/270; 426/324; 426/332; 426/335; 426/392; 426/410; 426/413; 426/665; 422/1
[58] Field of Search ..................... 426/392, 410, 426/268, 324, 262, 270, 413, 665, 335, 332; 422/1, 39

[56] References Cited

U.S. PATENT DOCUMENTS

| | | |
|---|---|---|
| 1,711,097 | 4/1929 | Kratzer . |
| 4,038,028 | 7/1977 | Rocne . |
| 4,804,402 | 2/1989 | Joubert . |
| 5,147,613 | 9/1992 | Heilmann et al. . |
| 5,228,394 | 7/1993 | Kanda et al. . |
| 5,288,462 | 2/1994 | Carter et al. . |
| 5,316,745 | 5/1994 | Ting et al. . |
| 5,328,703 | 7/1994 | Nakagawa et al. . |

FOREIGN PATENT DOCUMENTS

| | | | |
|---|---|---|---|
| 480422 | 4/1992 | European Pat. Off. | ............... 426/410 |
| 59-210873 | 11/1984 | Japan | ..................... 426/410 |
| 62-066862 | 3/1987 | Japan | ..................... 426/410 |
| 1-314557 | 12/1989 | Japan | ..................... 426/410 |
| 2-150264 | 6/1990 | Japan | ..................... 426/410 |
| 2-171172 | 7/1990 | Japan | ..................... 426/410 |
| 2-231063 | 9/1990 | Japan | ..................... 426/410 |
| 2-257864 | 10/1990 | Japan | ..................... 426/410 |
| 2-257865 | 10/1990 | Japan | ..................... 426/410 |
| 3-87165 | 4/1991 | Japan | ..................... 426/410 |
| 5-091467 | 4/1991 | Japan | ..................... 426/410 |
| 3-183435 | 8/1991 | Japan | ..................... 426/410 |
| 3-183436 | 8/1991 | Japan | ..................... 426/410 |
| 3-183438 | 8/1991 | Japan | ..................... 426/410 |
| 3-280869 | 12/1991 | Japan | ..................... 426/410 |
| 4-304838 | 10/1992 | Japan | ..................... 426/410 |
| 5-252921 | 10/1993 | Japan | ..................... 426/410 |
| 5-284949 | 11/1993 | Japan | ..................... 426/410 |
| 6-030696 | 2/1994 | Japan | ..................... 426/410 |

OTHER PUBLICATIONS

Food Technology Mar. 1989 pp. 89–107.
Food Technology Jun. 1993 pp. 170–172.
J. of Jap. Soc. of Food Science and Technology 1993, 40(6) 406–413 (Dialog Abstract only) 426/410.
Deutsche Lebensmittel–Rundschau 1992, 88(3) 74–76 (Dialog Abstract only) 426/410.
Japanese Packaging Report (23) 1991 p. 11 (Dialog Abstract only) 426/410.
Int'l J. of Food Microbiology 12(1991) pp. 207 plus 426/410.

*Primary Examiner*—Steve Weinstein

[57] ABSTRACT

Foods, food ingredients, and cooked foods are preserved by the application of pressure of at least 70 MPa (10,000 psi) for more than twelve hours. Some meat and seafood requires maintenance of pressure for the duration of storage and most can be held in good condition without spoiling for more than 1 month. For some fruits and vegetables ripening is stopped by the pressure treatment and packaged products can be stored without refrigeration for at least 6 months while other fruits and vegetables are preserved by 5 day pressure treatment at 175 Mpa (25,000 psi). Meat and seafood is preserved by pressure treatment in various marinades. Because no heat is used foods retain much of their firmness and texture.

11 Claims, No Drawings ized. Every sample of peas, beans, beets or other vegetables spoiled after such treatment. Because of this work, for many years little attention was paid to this potential method of food preservation.

HYDRAULIC PRESSURE STERILIZATION AND PRESERVATION OF FOODSTUFF AND FEEDSTUFF

RELATED APPLICATIONS

This application is a continuation-in-part or Ser. No. 08/349,937, filed on Dec. 6, 1994, now U.S. Pat. No. 5,593,714.

This invention relates to the sterilization and preservation of objects, liquids and foods through the inhibition of microbiological growth and the killing of micro-organisms, spores, viruses and macro-organisms by the application of pressure. The methods and machines described allow production of unique products by manual means without the application of heat, radiation or chemical preservatives.

BACKGROUND

Proper food preservation is an important activity because in addition to providing palatable and nutritional products it protects people and animals for food-born diseases, especially bacteria, fungi, and parasites. It also prevents the production of toxins after harvest and provides for extended usage of food resources. Drying, salting and smoking are ancient methods of preserving food. Canning is one of the major methods which allows extended shelf life of foods. Sterilization with heat in plastic packaging is a more recent successful method. Newer promising methods include radiation, and even high magnetic fields can reduce the bacterial counts for some organisms. Freezing is an expensive method of preserving, transporting, marketing and storing foods and the cellular destruction of food which occurs when foods are frozen is undesirable for some foods.

It was discovered early in this century that only a limited number of foods could be sterilized by pressure alone (Hite, et al., 1914) Peaches and pears were preserved and stored for 5 years, after treatment of about 400 MPa (57,000 psi). Apple juice with natural flora treated at pressures above 400 MPa (57,000 psi) for ½ to 2 hours did not ferment. By contrast fermentation of blackberries and raspberries usually occurred after similar treatment. Very few samples of tomatoes subjected to 680 Mpa (97,000 psi) for 1 hour were sterilized. Every sample of peas, beans, beets or other vegetables spoiled after such treatment. Because of this work, for many years little attention was paid to this potential method of food preservation.

Recently orange juice, kiwi jam, and strawberry jam were successfully preserved by pressure treatment (Hayashi, 1990).

The pressure treatment of some micro-organisms to pressures of 63 MPa (600 atmospheres) for 2 days caused growth cessation. These species included, *Alcaligenes viscosus, Bacillus subtilis, Escherichia coli, Micrococcus luteus, Mycobacterium phlei, Proteus vulgarius, Pseudomonas fluorescens, Sarcina lutea, Serriatia marcescens, Staphylococcus aureus, Streptococcus lactis, Hansenula anaomala, Saccharomyces cerevisiae* and *Torula cremoris* (ZoBell and Johnson. 1949). For shorter periods and higher pressures sterility is not obtained for many bacterial species. Salmonella recover to 0.1% of initial number in 4 hours after a 30 minute exposure to 510 MPa (5,000 atmospheres, 73,000 psi). *Saccharomyces cerevisiae* are killed in apple juice, orange juice and cranberry juice in 30 minutes at about 450 MPa (4,350 atmospheres, 64,000psi) but not at about 300 MPa (3,000 atmospheres, 43,000 psi).

The reason for very limited success in preservation of foods by pressure alone is the resistance of spores of many strains of bacteria to great pressure. For example 10% of spores of *Bacillus cereus* survived pressure of 900 MPa (8,700 atmospheres 128,000 psi)(Shigehisa, et al, 1991). Spores of *Bacillus coagulans* are reduced by 90% at 450 MPa (4,350 atmospheres, 64,000 psi) for 30 minutes, but higher pressure had even less killing effect (Gould and Sale, 1970). Spores of *Bacillus cereus* and *Bacillus polymyxa* survive at 1% to 2% after ambient temperature pressurization to 300 MPa (3,000 atmospheres, 43,000 psi) for 1 hour while 100% of *Bacillus subtilis* A spores survive under these conditions (Gould and Sale, 1970).

Bacteria can be destroyed if exposed to gas under pressure when the pressure is released and the gas expands. In this procedure nitrogen gas is mixed with bacteria so that under pressure the nitrogen dissolves with the bacteria so that at the time of rapid release the nitrogen forms a gas within the bacteria causing them to break apart. U.S. Pat. No. 1,711,097 to Kratzer illustrates such a method.

U.S. Pat. No. 5,316,745 to Ting and Raghavan discloses a method without examples of sterilization with pressure at very high ranges from 40,000 to 55,000 psi. The inventor states that "a series of pressurizations has been found to be more effective in killing or disabling the organisms" and teach that the pressurization cycles be repeated until sterilization is complete. No minimum time for, holding at high pressure is taught. The method claim includes a step "c" for exporting and importing material to be sterilized.

U.S. Pat. No. 5,288,462 to Carter and Brazell discloses a method for sterilizing materials which involves very rapid decompression, from 1 to 10 milliseconds. This method apparently works at pressures as low as 1,000 psi. The method was applied to dental instrument sterilization and the effect of rapid decompression on food appearance and quality is not known.

U.S. Pat. No. 5,228,394 to Kanda, et al, describes but does not claim a three chamber system method in which food liquids such as fruit juice, milk, and sake are pressurized to a pressure of 2,000 to 4,000 atmospheres (39,400 psi to 58,800 psi) for 5 to 20 minutes.

U.S. Pat. No. 5,328,703 is for a method of preserving juice using pressure of greater than 2,000 atmospheres with added proteolytic enzyme to assist in preventing separation of components. Claim 6 distinctly sets a time between 5 and 120 minutes. This method only claims fruit juice.

Japanese patent JP 4304838 A describes a process using pressure greater that 1000 atmospheres followed by heat treatment of greater that 60 degrees C. Heating was necessary in this process as in many others.

Because of such reports and experience no general method has been developed for the use of hydrostatic pressure to preserve foods.

SPECIFICATION

It is an objective of this invention to provide methods which can be used to sterilize a large variety of foods and food components. It is a further objective of this invention to provide a method for sterilization of inanimate objects. It is also a purpose of this invention to provide a means for killing potentially disease causing micro-organisms and macro-organisms such as parasites, worms, worm eggs and the like by the application of pressure. The methods described to preserve foods also provide a firmness of quality, prevent the ripening of some fruits and vegetables and allow preservation of food components such as mayonnaise and salad dressing which cannot be preserved by freezing methods or canning.

For the purposes of this invention the following terms are defined:

"Foodstuff" is an art recognized term which denotes, foods and food materials which alone or in combination with another substance, have nutritional or flavor value are suitable for consumption by humans. It includes both harvested and processed forms. "Feedstuff" is an art recognized term which denotes food materials similar to foodstuff which is suitable for consumption by animals.

"High pressure" means pressure of at least 200 MPa (28,600 pounds per square inch). "Moderately high pressure" means pressure of between 70 Mpa (10,000 psi) and 200 Mpa (28,600 psi).

"Sterile" means no bacterial, fungal or other growth of life forms excluding viruses for a period of at least 30 days.

"Preserved" means no evidence of microbial contamination in the form of gas production, chemical reduction as evidenced by lightening of the color of meat, visible filamentous growth, cloudiness of solution surrounding solid foodstuff and feedstuff, production of odorous compounds, or coagulation.

"Matter" means liquid and viscous materials such as but not limited to ground water, well water, river water, liquid suspensions, facial creams, gels, juices, bread dough, sewerage; and solid objects such as but not limited to whole and cut fruits and vegetables, meat, cheese, baked goods like tortillas; and materials and items compatible with aqueous solutions in need of sterilization such as but not limited to moist towels, surgical instruments, syringes and needles.

"Nutrient materials" means substances in whole or in part which are to be used for the growth of living organisms, including but not limited to viruses, plants, sprouts, bacteria, fungi, invertebrates, and vertebrates.

The successful preservation of food is shown by the following examples. Example 1 consists of the preservation of fruit samples held for a period of 5–8 days at a pressure of 175 Mpa (25,000 psi) at ambient temperature (18–23 degrees C.) using commercially available plastic which is sealed by heat. In these experiments heat sealable packaging by Foodsaver®, U.S. Pat. No. 4,756,422 was used. Such systems are used in home freezing and cooking and allow a heated electrical bar to be pressed against the plastic opening to allow a fusing of the plastic for the front and back layers. Similar types of plastic can be sealed by hand with the appropriate type of closure system such as that seen in the plastic zipper type systems available commercially. Evidence of bacterial growth was established by formation of gas in the bag, cloudiness in the water solution surrounding the fruit, rotting smell or disintegration of the food. To help preserve the appearance of pealed fruit a commercially available vitamin C and citric acid mixture was added to the water portion of the package in the amount of 1 teaspoon powder per cup of water. This solution was added in an amount which allowed the fruit to be covered when air was expelled during the sealing of the package. In preserving fruit cut to the size of the package added solution is not needed and the vitamin C citric acid mixture can be added in powder form to prevent surface discoloration. Most samples were preserved in packets ranging is sizes form about 1 inch square to 2 in by 5 inches (a whole egg). Samples were pressure treated in a commercial pressure device manufactured by Autoclave Engineers having a chamber capacity of about 3 liters. Pressurization was developed by a primary compressed air system and the equilibrium pressure was achieved in 3 to 5 minutes. Decompression was undertaken smoothly over a period of about 10 to 30 seconds. Oil was used externally of the sealed plastic packets used in packaging foodstuff, to prevent corrosion of the metal components. Water is preferred to oil for this purpose in commercial settings because it is necessary to remove external oil for observation and product evaluation.

EXAMPLE 1

Successful Sterilization of Fruits apricot
black grape
blueberries
kiwi
mango (early ripeness)
peach
pear In general, pressure treatment stops the ripening process. In most cases the fruit preserved is firm after the pressure is reduced and the samples remain firm during storage. This a very desirable feature of this preservation process because firm and crunchy fruits are preferred by many people and the quality of the preserved fruit is much closer to fresh fruit than is canned fruit. Even frozen fruit has a tendency to become soft because the freezing process causes cellular breakage as the ice expands. Thus some pressure preserved fruit is better than either canned and frozen product.

In a preferred embodiment fruits a preserved without addition of extra water of solution and the fruit is cut to fit the package. To reduce external discoloration vitamin C, citric acid, or both are added in powdered form or as a concentrated solution to the solid fruit.

In another preferred embodiment whole, peeled or cut fruit is surrounded by a solution of vitamin C, citric acid, or both in a concentration sufficient to prevent or reduce discoloration. Amounts of from $\frac{1}{10}$ teaspoon to 2 teaspoons per cup will be sufficient for most purposes. Preparation of food for preservation should be done with routine hygienic methods to reduce contamination. Water sources should be pathogen free, utensils should be disinfected and hands should be cleaned regularly and gloves should be worn and routinely disinfected.

EXAMPLE 2

Unsuccessful Preservation of Fruits very ripe mango - extensive discoloration
white grapes - turned brown White grapes were preserved but turned brown. White grapes were successfully preserved by surrounding them with yogurt but the still discolored to a brown color. A ripe mango became extensively discolored (Example 2).

Wine can be made without preservative if the grapes are treated with pressure and inoculated with the desired yeast strain. For making wine without the use of sulfites it may only be necessary to treat the crushed grapes long enough to inactivate the majority of endogenous microorganisms. Defined yeast cultures can then be added in large enough quantities to produce enough alcohol to prevent undesirable residual organisms from becoming a problem. This method reduces potential variability in wine production that may result from changes in endogenous yeast species.

For several types of bacteria which grew after pressure treatment it was discovered that yogurt could stop or prevent their growth. Three sources, those present in fresh corn, market obtained beef and market obtained chicken, were not able to grow when place in yogurt and re-pressurized. Either the acidity of the yogurt culture or yogurt component may be responsible for this effect. The following products were successfully preserved in pressure treatment when surrounded by about 20% by volume yogurt and pressurized for 5 to 8 days at 175 MPa (25,000 psi): white grapes, beef, and emu meat. As with pressure alone green grapes turned brown.

EXAMPLE 3
Successful Sterilization of Vegetables & Mushrooms bell pepper
black eye peas
cabbage
cucumber
banana (some external darkening)
hot pepper (darkened)
shitaki mushroom
snow peas
soybeans
spinach
tomato
Woodear mushroom In general above ground harvested vegetables are prevented from further ripening and preserved with considerable firmness when preserved at a pressure of 25,000 psi for 5 to 8 days. Example 3 list some vegetables and other foodstuff successfully preserved.

Green vegetables have a tendency to become lighter in color and some darker green ones turn brownish. Shitaki and Woodear mushrooms change little in color. Spinach becomes dark but does not disintegrate. Cilantro is sterilized but has little structure left after pressure treatment. Common button mushroom are sterilized by pressure treatment but turn black after treatment. These blackened mushrooms are not a good substitute for fresh mushrooms. Bell pepper becomes lighter in color but remains firm for at least 8 months. Cabbage remains hard in texture for at least 5 months but looses its green color. Tomato retains a red color if treated with vitamin C-citrate mixture but otherwise darkens somewhat.

Root vegetables are usually preserved well if peeled. Example 4 list some of the root vegetables which are successfully preserved by 5 to 8 day pressure treatment at 175 Mpa (25,000) psi.

EXAMPLE 4
Successful Sterilization of Root Vegetables diakon (peeled)
carrots (peeled)
onion (peeled)
garlic (peeled)
potato (with skin) and Citrate 3%, pH 7

All five examples of root vegetables remain firm after preservation. The diakon became darker in color that the white color originally preserved. The potato sample was a small red (new) potato which was not sterilized when surrounded by water alone. It is known that bacterial spores are stabilized by having about 8% by weight of a calcium dipicolinate acid salt. Citrate is a known calcium chelator and this ability may cause some resistant spores to becomes sensitive to pressure killing by interfering with the calcium pinicolate protection.

A number of root vegetables are not sterilized by pressure for 5–8 days at 25,000 psi. This may be due to spores in the soil that are resistant to the treatment. In the above examples of successful preservation the contaminating soil was removed by peeling. Example 5 list examples of root vegetables which having external surface present were not sterilized by this pressure treatment protocol.

EXAMPLE 5
Unsuccessful Sterilization of Vegetables

Yucca
Jerusalem artichoke
Potato in water (unpeeled)

In addition to fruits, vegetables, fish, and meat, solid foods, semisolid and liquid foods and prepared foods are sterilized by pressure treatment at 175 Mpa (25,000) psi for 5–8 days. Example 6 list some of these products.

EXAMPLE 6
Successful Sterilization of Solid, Semisolid and Liquid Foods butter (semisolid)
cheese (semisolid)
chicken salad with mayonnaise (semisolid)
flour tortilla (solid)
milk (liquid)
orange juice (liquid)
pepperoni (solid)
yogurt (semisolid)

From these examples it can be seen that many foods which could not be sterilized by short term treatments at even higher pressure can be sterilized at high pressure for longer periods such as the five to eight days used in these examples. The successful sterilization of mayonnaise containing products provides the opportunity for preserving such foodstuff which freezing does not allow. Salad dressing and mayonnaise products separate in the freezer and foodstuff made with such emulsion cannot be successfully stored in the freezer.

Tomatoes were successfully preserved with added vitamin C and citric acid which could not be preserved for short times at very high pressures as reported by others.

In some cases the vitamin C-citric acid mixture allows preservation that would otherwise not occur. Soybeans with vitamin C-citric acid were sterilized but not without such external addition.

Ocean foods, such as scallops and shrimp, even in vitamin C-citric acid medium are not sterilized. This is thought to be due to the fact that ocean bacteria live normally at pressures of at least 150 MPa in the deepest oceans. It should be noted however that while bacteria are not killed under the pressures used nevertheless they do not grow during this time. This is seen where the scallop and shrimp samples are degraded within one day of decompression while they were unaffected during a five day holding period. Thus seafood can be preserved for some time while being maintained under high pressure.

Pressure affects ripening and maturation of some foodstuffs but not other similar products. Inoki mushrooms without added water were of poor quality after pressure treatment and were not sterile. Common button mushrooms were sterile but slowly turned black. Shitaki mushrooms were sterile and preserved in structure. Woodear mushrooms had firmness as well as structure.

Leafy products such as cilantro became brown with considerable loss of cellular matter. Cabbage on the other hand became lighter but remained firm.

The fact that pressure alone can be used and the fact that pressure can be generated easily by manual means recommends this method for preserving food for cases where electricity is not readily available. In some cases the quality of the product is better than that which can be provided by the canning process. In a preferred embodiment pressure for food preservation is generated by manual means. This can be accomplished by providing one or more pressure force amplifying cylinders.

Intermittent treatment with pressure was suggested by observations that spores were activated by pressure, and this method was attempted by raising the pressure in milk samples to 25,000 psi and maintaining the pressure for 1 hour, on 3 successive days at 24 hours intervals. While it took some days for microbial growth to coagulate the milk, sterilization was not achieved by short term intermittent treatment. This and the many reports of unsuccessful preservation of food by high pressure treatment shows that the method required for obtaining sterilization is not obvious.

To improve the quality of foodstuffs to be consumed by man where appearance is an important aspect of food quality, anti-oxidants are added to reduce discoloration and browning. Ascorbic acid is the preferred antioxidant but many other antioxidants can be used to accomplish. The amount of anti-oxidant required to be added depends on the foodstuff, it stage of ripeness, existing antioxidant activity, the amount of residual oxidants, and the rate of penetration of oxidizing species to the foodstuff through any packaging material. It is well with the art to know the type and amount of anti-oxidant needed for improving the aesthetic quality of foodstuff. The time course of pressurization is adjusted to allow the desired firmness of the foodstuff for those foodstuffs which are affected in shape or structure by the pressure application.

In another preferred embodiment green food coloring is added to green vegetables which tend to brown discoloration during preservation.

Efficient and safe packaging of foodstuffs requires that the packaging materials be strong enough to sustain pressure for dry items. The shape of packages should accommodate the 5% to 7% reduction of liquid volume which occurs during the pressure stage. Thus packages for foodstuffs for human consumption will be opaque for items sensitive to light. Packets which can be layered to reduce external water volume and allow more material to be pressure treated in a given batch are a preferred embodiment. In some cases the quality of the preserved food needs to be seen by the purchaser in which case one side of the package or a portion of that side will be transparent.

Hand sealing packages may be needed for situation where heat sealing apparatus is not available, but heat sealed strong plastics are preferred. Heat sealing can be done with combustion-heated sealing devices as well as electrical devices. Strictly mechanical sealing is another preferred method for sealing packages where heat sealing is not feasible.

Vacuum sealing is preferred for dry objects and foodstuff to be preserved without added solution to initiate tight fitting of the container to the material being sterilized.

In addition to the preservation of foodstuffs, the method described herein is applicable to the sterilization of water for drinking. The effectiveness of pressure for sterilization of water is evident from the sterilization of foodstuffs to which tap water was added. If tap water contained pressure resistant microbial species then all but the dry samples would not have been preserved.

In another preferred embodiment pressure treatment is used to sterilize culture media. Many components of cell and tissue culture cannot be sterilized by heat, for example serum or plasma, and some vitamins. Such heat sensitive components must be sterilized by filtration with filters that do not allow bacteria and viruses to pass. At the present time there is no way to sterilize macromolecular components that may be heat sensitive. For example in the sterile culture of mushrooms it may be necessary to add sterilize plant material or tree bark. If essential nutrients are sensitive to heat only pressure sterilization will allow preparation of culture media. As a cost savings and for volume production microbial and tissue culture containing heat sensitive substance may be sterilized by pressure treatment.

An additional benefit of this method of foodstuff preservation is that impure water can be used as the water as well as the foodstuff is sterilized, although pathogen-free water is preferred. This applies as well to inanimate objects.

The method herein described is also suitable for the treatment of sewerage, thereby eliminating the need for the chlorination process and the resultant formation of suspected cancer causing organic chlorine compounds. Both solids with residual water and low solids effluent can be treated by this method. In a preferred embodiment low solids effluent is pressure treated in a continuous process wherein pressure concentrated energy is recovered in the fluid being reduced in pressure to pressurize incoming fluid. A sample of human feces was pressurized for 5 days at 25,000 psi. No bacterial growth or gas formation occurred in this sample.

In addition to having environmental benefits the methods disclosed provide considerable energy savings. The cost of pressurization is low. Having preserved foodstuff by the method disclosed refrigeration is not required. Overall shipping costs are less than for canned goods because less liquid is need for many products and plastic packaging is lighter than metal cans.

In a commercial setting pressure energy savings can be obtained by having a plurality of pressure chambers. For a five day pressure treatment cycle, 20% of the pressure chambers are pressurized on the first day. On 3 subsequent days an additional 20% are so treated. On the fifth day the first 20% set of chambers are used to pressurize the last 20%. Either of two methods can be used. In one case some of the chambers to be pressurized are partially pressurized in decreasing pressure levels so that chambers being brought to ambient pressure can be serially connected to those being pressurized. In the other case chamber being reduced to ambient are serially connected to those being pressurized. In this latter case as an example, a first decompressing chamber at 20,000 psi is connect to a first compressing chamber so that each reaches 10,000 psi at equilibrium. Next the 10,000 psi decompresing chamber is connected to a second ambient compressing chamber so that each becomes 5,000 psi. The first compressing chamber is connected to a second decompressing chamber so that each becomes 15,000 psi. This process continues so that decompressing chamber are connected serially to compressing chambers from 3 to 10 times allowing savings of from 40% to 90% of the energy needed to compress the final 20% of chambers from ambient to high final pressure. On subsequent days other decompresing sets of chamber are similarly used to compress the next set. In the first method the set to be compressed are partially compressed so that each can be serially connected to the decompressing set. In both methods each compressing chamber must be pressurized from the equilibrium level with its last equilibrated decompresing chamber to the final compressing pressure. For large sets of chambers the energy needed to compress from the last equilibration between a decompressing chamber and a compressing chamber to the final pressure represent most of the energy needed for the preservation process.

The inability of pressure resistant bacteria to grow in yogurt suggest the use of yogurt to assist in pressure preservation. White grapes, beef, and emu meat were successfully sterilized by pressure treatment when surrounded by yogurt.

Chicken meat presents a difficult product for pressure preservation. While showing no gas production chicken meat becomes soft when preserved in yogurt. Chicken surrounded in wine and pressure treated remains firm. Chicken when held at pressure for 12 days shows no degradation when recovered at ambient pressure suggesting long-term storage at pressure as with some seafood.

In general a majority of fruits, vegetables and foodstuff and some meats can be sterilized with retention of physical food characteristics by the method disclosed. Some foodstuff can be preserved by application of pressure when preserved in lemon, vinegar, yogurt or wine based marinade. For a few foodstuffs preservation requires that the foodstuff be maintained under pressure until it is to be cooked or consumed. It is anticipated foodstuffs which would not otherwise be sterilized by pressure alone can be preserved after being cooked. This is seen in the successful preservation of chicken salad and for samples described below preserved at 10,000 psi.

Several foods were preserved when surrounded by monochlorotaurine. Whole green grapes were sterilized by in a solution of 5 ppm, 50 ppm and 500 ppm monochlorotaurine after being held for 5 days at 175 Mpa (25,000 psi). One sample of beef was preserved with 500 parts per million of monochlorotaurine. One sample of blueberries was preserved with 500 parts per million of monochlorotaurine. Monochlorotaurine kills some bacteria at 200 parts per million. The benefit of using monochlorotaurine for reducing bacteria in lieu of neutral hypochlorite or chloramine is that monochlorotaurine does not react with amino groups and does not produce organochlorine derivatives. In cases were a small amount of reactive chlorine is needed dichloramine in a an amount of 1 to 10 parts per million can be added to monochlorotaurine. The amount of monochlorotaurine appropriate for specific foodstuff can be established without undue experimentation. In a preferred embodiment chlorotaurine, either monochlorotaurine in an amount from 5 to 500 parts per million, or with the addition of 1 to 10 parts per million of dichlorotaurine is added to solid foodstuff to destroy external or topical microorganisms and is added as a small amount of solution to solid foodstuff in packaged form.

In a preferred embodiment the sterilization method described is utilized for feedstuff as well as foodstuff. In another preferred embodiment the sterilization method is applied to nutrient matter and to non-foodstuff and non-feedstuff matter that when surrounded by liquid medium and subjected to pressure sterilizes said matter.

To provide additional data on the preservation of foodstuff having microbial species resistant to a pressure of 175 Mpa (25,000 psi) samples of fresh chicken breast, salmon filet, tuna filet and shrimp were packaged in plastic, surrounded by a small amount of tap water and pressurized to 25,000 psi (175 Mpa) for 33 days. The sample of chicken breast meat when removed from its package looked good, was firm and had no odor. The salmon filet looked good, hand an intact firmness and only natural odor. Tuna filet looked good, had an firmness similar to that of fresh tuna. Another sample of chicken that had been pressurized for 33 days was then held at in its package at room temperature for 3 weeks. It became discolored liquid, large amount of gas was produced and a very strong rotten egg odor developed. This shows that chicken held at pressure does not spoil despite the fact that microorganisms are present. Shrimp was similarly successfully preserved over the 33 day period while held under pressure. However when removed from pressure shrimp eventually spoiled (3 weeks). Even shrimp in yogurt spoiled. Shrimp in lemon juice also spoiled after being removed from the pressure chamber. Tuna filet was successfully preserved for 33 days at ambient temperature under a pressure of 25,000 psi (175 Mpa). It did not spoil over a 3 week period after pressure was removed. This was the case for tuna filet in water, yogurt or lemon juice. These examples show that foodsuff that is not preserved by short term pressure treatment (up to 5 days) can be preserved for a long time if held under pressure. The 33 day time period used is long enough for conventional shipping system to move food to many places in the world. It is reasonable to expect that even longer times will be effective if they are needed. For example it is expected that if a fishing boat needs to remain at sea for 3 months, fish caught all during the voyage can be preserved by being held under pressure without refrigeration. The fish can be processed either on the ship or in port at the end of the voyage. Being able to process seafood in port rather than on the ship allow considerable reduction in the overall cost of processing the seafood. In a preferred embodiment foodstuff is placed in a pressure chamber fitted to be accommodated as a container cargo. This may be accomplished by either placing the pressure chamber in a standard container or by having the pressure chamber designed to fit among standard ocean-going containers.

Prior art claims for pressure preservation range from minutes up to 5 hours. To affirm the original experiments showing the inability of pressure to preserve food over short interval of time samples were pressurized at 175 Mpa (25,000 psi) for a 6 hour period. Example 7 shows the state of control and experimental samples at 11 days, 35 days and 6.5 months after pressure treatment.

EXAMPLE 7

| FOODSTUFF NONE VS 6 HRS | CONTROL 11 DAYS ROOM TEMPERATURE | CONTROL 35 DAYS | CONTROL 6.5 months | 6 hour −25 Kpsi 11 DAYS ROOM TEMPERATURE | 6 hour −25 Kpsi 35 DAYS ROOM TEMPERATURE | 6 hour −25 Kpsi 6.5 months ROOM TEMPERATURE |
|---|---|---|---|---|---|---|
| 1. Blueberries | gas, cloudy | — | — | OK (pack leak) | extensive mold | — |
| 2. Butter | OK | mold | black mold | OK | indefinite | OK |
| 3. Carrot | gas, cloudy soln | — | — | OK | cloudy soln | 1 colony inside |
| 4. Cheese | white mold | more mold growth | — | green mold | — | — |
| 5. Chicken salad | gas | — | — | — | — | — |
| 6. Diakon, peeled | gas, cloudy, soln | — | — | OK | indefinite | OK |
| 7. Green grape | OK | mold | — | OK | white surface spot | OK |
| 8. Kiwi, peeled | gas | — | — | OK | indefinite | OK |
| 9. Mango | gas | — | — | OK | indefinite | liquefied |
| 10. Milk | coagulated | coagulated | — | coagulated | coagulated | coagulated |
| 11. Nectarine | bloated package | — | — | OK | OK | filaments present |
| 12. Orange juice | indefinite | indefinite | discolored | OK | OK | slight darkening |
| 13. Pear | gas | — | — | mold | mold | mold |
| 14. Pepperoni | OK | fine mold? | indefinite | OK | fine mold | white mold on rim |
| 15. Potato | gas | — | — | gas | — | — |
| 16. Red grape | gas | — | — | OK | mold in solution | mold in solution |
| 17. Tortilla, dry | OK | OK | OK | OK | OK | OK |
| 18. Yogurt, | gas | — | — | OK | gas | coagulated |

It can be seen from Example 7 that only butter, peeled diakon, peeled kiwi, and dry tortilla were preserved when pressurized for only 6 hours. The control sample of tortilla did not spoil. While intermediate times between 6 hours and 5 days have not been studied it is well with the skill or practitioners to determine what time between 6 hours and 5 days is appropriate for different types of foodstuff, feedstuff, or other material to be preserved or sterilized.

The pressure used in the previously described cases was 175 Mpa (about 25,000 psi). Because this pressure is that near the maximum for composite chambers a series of samples were preserved for 5 days at a pressure of 70 Mpa (approximately 10,000 psi). As with previously described samples, samples for pressure treatment at 10,000 psi were place in plastic bags, water, marinade, or other solution added except as noted for some samples, and the bag heat sealed. Example 8 is a list of foodstuff which was pressure treated for 5 days at 70 Mpa (10,000 psi) and for which preservation was unsuccessful.

EXAMPLE 8
Food Preservation Failures at 10,000 psi for 5 Days
asparagus
blueberries
cheramoya
chicken salad—1 of 3 brands
cooked chicken (only one of 2 samples)
date, red (oriental crab apple)
egg contents
grape, red
grapefruit sections—fresh peeled
green fig, 2 samples
half & half (ultrapasteurized)
herring in vinegar solution (commercial)
horn melon
jicama, pealed
kiwi
milk, 2 brands
nectarine
papaya meat—2 samples
pear
plantain
quince
raspberries
sapote
soy fiber based paste
star fruit (mold)
tomatillo
tomato It can be seen by comparing Example 8 foodstuff with others that many foodstuffs are successfully preserved after being held for 5 days at 175 Mpa (25,000 psi) but not when held for 5 days at 70 Mpa (10,000 psi). A critical cutoff for pressure effect should not be surprising. The phenomenon occurs with heat treatment of microorganisms. Many examples exist where a specific microorganism is unaffected at 37 degrees centigrade indefinitely but otherwise is killed at 40 degrees or 45 degrees centigrade after a short time. It appears that pressure effect may also show threshold effect for microorganism that commonly occur with foodstuff.

The pressure of 70 Mpa (10,000 psi) seems to be adequate for preserving a variety of foodstuff, especially cooked food and meat and fish in marinades. Example 9 lists foodstuff successfully preserved by being held for 5 days at 70 Mpa (10,000 psi).

EXAMPLE 9
Successful Food Preservation at 10,000 psi for 5 Days
Foods Successfully Preserved (for at least one month) for which control samples were spoiled.
beef, cooked, water
broccoli
brussel sprout
chicken breast in teriyaki marinade
chicken salad—2 of 3 brands
emu meat in water
emu meat in yogurt
fish, marlin, teriyaki marinade
fishcake (fish with a breaded coating)
hamburger meat, cooked
honey dew melon
milk, pasteurized (Sealtest)
mild, ultra-pasteurized (S. pride)

okra
passion fruit (no control)
pepper, jalipeno
shrimp, cooked, in tarter sauce (Kraft brand, UPC 64946)
spaghetti sauce (home made)
spinach
string beans
Swiss cheese It can be seen from Example 9 that many foodstuffs can be preserved at 70 Mpa (10,000 psi). While this pressure is not as effective as 175 Mpa (25,000 psi), some foodstuff can be preserved at this lower pressure. The optimal pressure and time needed for various foods and processing methods can be determined without undue experimentation.

In a preferred embodiment properly cooked food is packaged after cooking and pressure treated for sufficient time to be preserved. The ultra-pasteurized milk sample has an extended shelf life because of a more extensive treatment of the milk that is used in routine pasteurization. The pressure treatment effectively controls an orange colored organism that eventually grows in this milk.

Pressure holding at 25,000 psi for 33 days preserved all samples of chicken and seafood tested. Successful pressure holding at 10,000 psi was achieved for most samples tested. Example 10 gives a comparison of the state of a variety of samples of fresh meat, seafood and milk which were held at the pressure of 70 Mpa (10,000 psi) for 36 days. As with the successful preservation of meat, fish and seafood at 175 Mpa (25,000 psi) such samples which cannot be preserved in water at this pressure is preserved so long as that foodstuff is held under pressure. This means that meat, fish and seafood can be shipped and held in storage without refrigeration of at least 1 month and probably longer. In some cases such foodstuff may be shipped in bulk, for example fish and large cuts of meat, while in other cases the foodstuff will be packaged prior to pressure holding often in a form suitable for market distribution.

To support the macroscopic view of preservation by holding at pressure of 70 Mpa (10,000 psi) for more than 1 month, fluid samples from frozen controls and pressure preserved foods were plated on common bacterial agar plates containing 5% sheep blood (casein digest, papaic digest of soymeal, salt and agar). A 2 mm diameter loop was filled with liquid and streaked on one side of the plate. The initial streak was then cross streaked and the cross streaks subsequently cross streaked again. Pressure treated samples were placed on the top of the agar plate and frozen control on the bottom. This method of steaking is used to allow isolation of colonies but it can also give perspective as to the relative number of bacterial present when high bacterial counts are present in the original sample (approximately 10 microliters). Among many pressure preserved samples no bacteria at all grew on the plate while all control samples had bacteria growing.

EXAMPLE 10

Preservation of Foodstuff for 36 days at 10,000 psi Condition and Comparative 24 hr. Bacterial Counts (2 mm loop)

| Food | Preserved Condition | Preserved Count | Frozen Count |
|---|---|---|---|
| Beef, ground (no water added) - looks good | | 0 | 100+ |
| Beef, kabobs - firm meat | | 0 | 50–100 |
| Chicken, breast meat - firm | | 0 | 10 |
| Conch - about 20 white colonies | | 50–60 | 100+ |
| Emu, filet - firm | | 0 | 0 |
| Fish, marlin - firm | | 20–30 | 100+ |
| Fish, salmon filet - firm | | 0 | 100+ |
| Fish, sea trout - firm - | | 0 | 100+ |
| Fish, Spanish mackerel - perhaps some softening | | 0 | 100+ |
| Lamb, chunks - firm | | 0 | 100+ |
| Milk, homogenized (Borden) - no coagulation | | 0 | 40–50 |
| Milk, homogenized (Mayfield) - no coagulation | | 0 | 100+ |
| Octopus, small - firm, some color change | | 0 | 50–70 |
| Pork, chop - firm | | 0 | 100+ |
| Pork, ground (no water added) - looks good | | 20 | 100+ |
| Scallop - firm | | 5 | 50–80 |
| Shrimp, fresh - firm, color change to orange | | 5 | 40–70 |

A sample of conch showed macroscopic white colonies on the body but none were apparent on the frozen control. Bacteria were present in the fluid surrounding the conch in the pressure preserved sample. Bacteria were not cultured after 18 hours in a liver sample which had white spots. But no bacteria were cultured from the frozen control liver sample either.

Successful preservation of milk for 36 days at 10,000 psi shows that milk can be stored by dairymen, transported from dairies and stored prior to distribution without the need for refrigeration. Tankers can be fitted with a bladder in the center of the tank to allow partial loads to be carried using water to fill the remainder of the tank on the opposite side of the bladder. While gas under high pressure is very dangerous, liquids are much less so. The major danger of water under high pressure is pinhole cracks for which over a short time a tiny hole produces what is equivalent to a water knife for cutting. Damage done by such a method of container rupture can be lessened by surrounding the chamber with material which can deflect such a stream of water.

In another preferred embodiment holding of meat and seafood at a pressure of 70 Mpa (30,000) psi extends the shelf life of such foodstuff because the level of residual bacteria is reduced considerably below that initially present.

Pressure treatment at 70 Mpa (10,000 psi) can be accomplished with steel pipe used in the oil and gas industry having about a 10 inch diameter. Also, small thin wall graphite reinforced epoxy spheres have been made which can be recycled to a pressure of 9,000 psi and have a burst pressure of 28,000 psi. Manufacturers have produced graphite fiber reinforced pipe that withstands 5,000 psi. Pressure experiment with 5 inch thick wall, glass fiber reinforce epoxy composite show that such thick wall composite can sustain deflection of 5 inches without breaking at a pressure of 200,000 psi. Such composite achievements strongly suggest that safe, reasonably priced (graphite fiber prices range from $10–$14 per pound) chambers can be made to accommodate 70 Mpa (10,000) pressures. Such chambers can be made for both stationary factory settings (sizes of 3 feet to 8 feet diameter and 10 feet to 30 feet long) and for shipment of meat, fish and seafood under pressure as container cargo. It is expected that freshly caught fish and other seafood can be stored on the ship under pressure of 70 Mpa (10,000 psi) without refrigeration and processed on shore at the end of the voyage.

Thus having described my invention I claim the following methods and products:

I claim:

1. A process for preserving foodstuff and feedstuff comprising the steps of:

placing said foodstuff or said feedstuff in a container and closing said container, pressurizing said container containing said foodstuff or said feedstuff to at least 70 MPa pressure so that said foodstuff or said feedstuff is place under said pressure, maintaining said pressure on said container and said foodstuff or said feedstuff for more than 12 hours at a temperature of between 18 and 23 degrees centigrade, then reducing said pressure on said container and said foodstuff or said feedstuff to ambient pressure, and finally removing said foodstuff or feedstuff from said container.

2. A process according to claim 1 comprising the additional step of:

placing said foodstuff or said feedstuff in a package prior to placing said foodstuff or said feedstuff in said container and closing said container.

3. A method of preserving foodstuff according to claim 2 wherein prior to placing said foodstuff or said feedstuff in said package said foodstuff or said feedstuff is mixed with marinade based on at least one major marinate component selected from the group consisting of yogurt, vinegar of final concentration greater that 0.1% acetic acid, lemon juice, soy sauce and wine.

4. A method according to claim 3 wherein said foodstuff or said feedstuff is selected from the group consisting of meat, fish and seafood.

5. A process according to claim 1 comprising the additional step of:

adding fluid to said container to remove air prior to pressurizing said container to at least 70 MPa force.

6. A process according to claim 5 comprising the additional step of:

placing said foodstuff or said feedstuff in a package prior to placing said foodstuff or said feedstuff in said container and closing said container.

7. A process according to claim 6 wherein said fluid is water and said container is pressurized internally by the addition of water.

8. A process according to claim 1 wherein said pressure is maintained for 5 days.

9. A process according to claim 1 wherein said foodstuff or said feedstuff is treated prior to pressurization with at least one substance selected for the group consisting of vitamin C, and citric acid in an amount sufficient to prevent surface discoloration of said foodstuff or said feedstuff.

10. A process according to claim 1 for preserving solid foodstuff wherein said solid foodstuff is surrounded with a solution of chlorotaurine in an amount of from 5 parts per million to 500 parts per million.

11. A process according to claim 10 wherein said chlorotaurine solution contains in addition 1 to 10 parts per million dichlorotaurine.

* * * * *